United States Patent [19]

Cross

[11] 4,310,600
[45] Jan. 12, 1982

[54] POLYESTER FILM HAVING ABRASION RESISTANT RADIATION CURABLE SILICONE COATING

[75] Inventor: Virginia R. Cross, Houston, Tex.

[73] Assignee: American Hoechst Corp., Somerville, N.J.

[21] Appl. No.: 182,334

[22] Filed: Aug. 29, 1980

[51] Int. Cl.$^3$ .................. B32B 27/36; B32B 27/30
[52] U.S. Cl. .................. 428/447; 156/272;
204/159.13; 204/159.15; 204/159.22;
204/159.23; 427/54.1; 427/171; 427/173;
427/299; 427/387; 427/412.5; 428/331;
428/451; 428/480; 428/483; 428/570; 428/522;
428/910
[58] Field of Search .............. 428/447, 451, 480, 522,
428/483, 520, 331, 910; 427/54.1, 387, 412.5,
299, 171, 173; 204/159.13, 159.15, 159.22,
159.23; 156/272; 264/22, 134

[56] References Cited

U.S. PATENT DOCUMENTS

| | | | |
|---|---|---|---|
| 3,443,950 | 5/1969 | Rawlins | 428/447 |
| 3,707,397 | 12/1972 | Gagnon | 428/412 |
| 3,708,225 | 1/1973 | Misch | 351/160 |
| 3,986,997 | 10/1976 | Clark | 428/412 |
| 4,027,073 | 5/1977 | Clark | 428/412 |
| 4,029,842 | 6/1977 | Yoshida | 428/447 |
| 4,103,065 | 7/1978 | Gagnon | 428/447 |
| 4,170,690 | 10/1979 | Armbruster | 428/447 |
| 4,177,315 | 12/1979 | Ubersax | 428/412 |
| 4,190,699 | 2/1980 | Kanazawa | 428/447 |
| 4,191,804 | 3/1980 | Weber | 428/447 |
| 4,197,335 | 4/1980 | Goossens | 427/387 |
| 4,198,465 | 4/1980 | Moore | 428/412 |
| 4,201,808 | 5/1980 | Cully | 428/40 |
| 4,207,357 | 6/1980 | Goossens | 427/387 |
| 4,211,823 | 6/1980 | Suzuki | 428/412 |
| 4,214,035 | 7/1980 | Heberger | 428/483 |
| 4,224,211 | 9/1980 | Kanazawa | 428/447 |
| 4,242,381 | 12/1980 | Goossens | 428/412 |
| 4,242,383 | 12/1980 | Goossens | 428/412 |
| 4,257,932 | 3/1981 | Beers | 260/18 S |

*Primary Examiner*—Ellis P. Robinson
*Attorney, Agent, or Firm*—Richard S. Roberts

[57] ABSTRACT

The present invention is directed to a clear, flexible, coated, biaxially oriented polyester film comprising a polyester film support and a radiation curable silicone coating on at least a portion of the support. The radiation curable silicone coating is derived from a dispersion of colloidal silica in an alcohol-water solution of the partial condensate of specified silanols and multifunctional acrylate monomers and oligomers with optional photoinitiators.

19 Claims, 3 Drawing Figures

POLYESTER FILM HAVING ABRASION RESISTANT RADIATION CURABLE SILICONE COATING

BACKGROUND OF THE INVENTION

The present invention is directed to abrasion resistant, coated polyester films and more particularly to polyester films having specified latex coatings and silicone coatings thereon. The present invention is also directed to coating processes for producing such abrasion resistant, coated polyester films.

PRIOR ART

Polyester films have recently found expanded applications as transparent and translucent layers applied to solid substrates and especially to transparent substrates. Thus, such films may be applied to windows of buildings and vehicles, as well as to many other types of windows and viewing or lighting media to control the transparency thereof. Additionally, polyester films have found many varied applications as independent substrates including uses in the optical arts for display purposes and in conjunction with electronic equipment having visual or optical screens and/or overlays. Also, recently developed membrane touch switches may contain an outer layer of polyester film.

While polyester films have many desirable physical properties for the above-mentioned and other uses, they do lack good abrasion resistance and have, as a result, not been as widely accepted as they otherwise might be.

Scratch resistant coatings, such as silica-containing solutions and polysilicic acid fluorinated copolymer compositions are available in the prior art. However, to date, a viable coated polyester film with high abrasion resistance has not been available for flexible films.

U.S. Pat. Nos. 3,986,997 and 4,027,073 (both to H. A. Clark) describe abrasion resistant coating formulations employing dispersions of colloidal silica in alcohol-water solutions of partial condensates of various silicon-containing organic compounds. These coatings are taught to be advantageous abrasion resistant coatings and may be applied to such substrates as sheets and films of acrylic polymers, polyesters, polyamides, polycarbonates, polyimides, copolymers of acrylonitrile-styrene, of ABS, polyvinyl chloride, butyrates, polyethylenes and the like. Thus, amongst the tremendously large field of substrates suggested, are films and sheets, including polyethylene terephthalate (polyester) films. Notwithstanding such disclosures, it should be noted that, of the twenty-two examples given in both patents, the substrates employed were panels of polymethyl methacrylate, acrylic panels, mirrored acrylic and polycarbonate panels, "Lexan," glass slides, aluminum panels and styrene-acrylonitrile copolymer material. Not a single example illustrates application of the taught compositions to polyester substrates, much less to polyethylene terephthalate, particularly, flexible polyethylene terephthalate film. It has been determined that the coating materials taught in these patents do not adhere successfully to polyethylene terephthalate to produce high abrasion resistant, flexible films.

It was not until the discovery of the present invention described herein that high abrasion resistant, flexible, silicone coated polyester films could be obtained.

BRIEF SUMMARY OF THE INVENTION

The present invention is directed to a clear, flexible, coated biaxially oriented polyester film comprising a polyester film support and a radiation curable silicone coating on at least a portion of the support, preferably on all of the support. The radiation curable silicone coating is derived from a dispersion of colloidal silica in an alcohol-water solution of the partial condensate of specified silanols and multifunctional acrylate monomers and oligomers with optional photoinitiators. The present invention is also directed to a coating process for producing such films, which process involves applying a latex coating to a uniaxially drawn polyester film support, heating it to dry the coating, stretching the film in a direction normal to the direction of the uniaxially drawn film to produce a biaxially oriented film, applying the mentioned radiation curable silicone coating and then curing it to dry the coating. In another embodiment an optional acrylic polymer latex coating is disposed between the support and the silicone coating.

DETAILED DESCRIPTION OF THE INVENTION AND DRAWINGS

Figure 1:
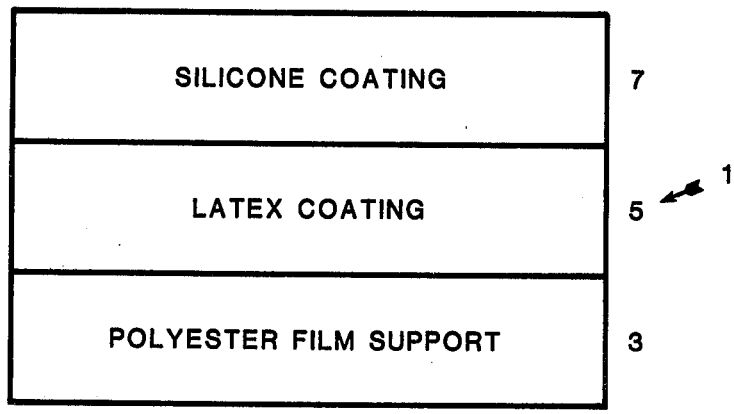
FIG. 1 illustrates a cut sectional view of a preferred film of the present invention.

The present invention provides a clear, flexible, coated, biaxially oriented polyester film which exhibits the physical characteristics of conventional polyester films and exhibits abrasion resistance far superior to that of the conventional polyester films.

The flexible polyester film support used in the present invention may be any flexible film formed from any thermoplastic film forming polyester which is produced by condensing a dicarboxylic acid or a lower alkyl diester thereof with a glycol. Among the dicarboxylic acids and their lower alkyl diesters which may be employed to form a flexible polyester film support are terephthalic; isophthalic; phthalic 2,5-, 2,6-, and 2,7-naphthalene dicarboxylic; succinic; sebacic; adipic; azelaic; bibenzoic; the hexahydrophthalics, and bis-p-carboxy-phenoxyethane. One or more of these acids and/or their lower alkyl diesters is reacted with one of more glycols which include ethylene glycol; 1,3-propanediol; 1,4-butanediol; neopentyl glycol or 1,4-cyclohexanedimethanol. Since one or more diesters may be reacted with one or more glycols, the polyester film of this invention is not limited to homopolyesters but also includes mixed polyesters such as copolyesters.

Of the film forming polyesters within the contemplation of this invention, preferred are those containing at least a major amount of polyethylene terephthalate, the most preferred being completely polyethylene terephthalate. Polyethylene terephthalate film is formed from a polymer produced by the polymerization of bis-(2-hydroxyethyl) terephthalate which is itself formed as an intermediate by one of two different methods. One method for producing bis-(2-hydroxyethyl) terephthalate is by direct esterification of terephthalic acid with ethylene glycol as described in U.S. Pat. No. 3,050,533. In this method the by-product of the reaction is water which is distilled from the reaction product. A second method for producing bis-(2-hydroxyethyl) terephthalate is by transesterification of dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of between about the boiling temperature of the reaction mixture to as high as 250° C. may be used. The reaction can occur at atmospheric, sub-atmospheric or super-atmospheric pressure. The by-product of the transesterification reaction is an alkanol. For example, if dimethyl terephthalate is used, methanol is produced. The alkanol is removed from the reaction product. In order to increase the reaction rate, many known catalysts may be employed in the transesterification reaction.

After the bis-(2-hydroxyethyl) terephthalate has been produced, it may be converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer may have an intrinsic viscosity, as measured in orthochlorophenol at 25° C., in excess of 0.3 deciliter per gram. More preferably, the intrinsic viscosity of the polymer ranges from about 0.4 to about 1.0 deciliter per gram, again measured in orthochlorophenol at 25° C. Still more preferably, the polyethylene terephthalate employed in the present invention has an intrinsic viscosity of about 0.5 to about 0.7 deciliter per gram as measured in orthochlorophenol at 25° C.

In a preferred embodiment, the polyester film forming polymer is melted and thereafter extruded onto a polished revolving casting drum to form a cast, flexible sheet of the polymer. Thereafter, the film is first uniaxially stretched and in a subsequent step is uniaxially stretched normal to the first stretching to result in a film which is biaxially stretched, that is, the film is stretched in the longitudinal and transverse directions.

In general, the polyester film support of the present invention is at least about 1 micron thick but must be thin enough to be flexible. Desirably, the film support is about 1 micron to about 1,000 microns thick, e.g., about 2 to about 500 microns thick.

Optionally applied to at least one side of the support is an acrylic polymer latex.

The thermosettable acrylic polymers present in the emulsion are well known in the art. Exemplary thermosettable acrylics which may be employed in the practice of this invention are set forth, for example, in *Encyclopedia of Polymer Science and Technology*, Vol. 1, Interscience Publishers, John Wiley & Sons, Inc., copyright 1964, at p. 273 et seq., and in *Chemistry of Organic Film Formers*, by D. H. Solomon, John Wiley & Sons, Inc., 1976 at p. 251 et seq. and the references cited therein, all of which are incorporated herein by reference.

These thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups inter-reaction between carboxyl and isocyanate groups; reactions between hydroxyl, for example polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyol, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_2$) alkyl acrylic ester or mixtures thereof, e.g., methyl acrylate, ethyl acrylate, methyl methacrylate, ethyl methacrylate, styrene, or mixtures thereof, in an amount ranging between about 75 parts to about 99 parts and, more typically, between about 80 parts to about 97 parts.

These thermosetting acrylic polymer emulsions are commercially available and are sold by Rohm & Haas, Philadelphia, Pa. as their Rhoplex ®. Generally, these emulsions contain from about 40 to about 55% solids.

The latex coating of the present invention is preferably a cross-linkable methylmethacrylate-ethylacrylate-methacrylamide terpolymer, which may be present in a concentration in the range of about 0.2 percent to about 45 percent by weight, based on the total weight of the latex coating. The terpolymer is further characterized by a glass transition temperature in the range of about 40° C. to about 50° C. Preferably, the terpolymer is present in a concentration in the range of between about 0.4 percent and about 10 percent by weight based on the total weight of the latex coating. In a more preferred embodiment of the instant invention, the terpolymer is present in a concentration of between about 1 percent and about 5 percent by weight, based on the total weight of the latex coating. The glass transition temperature of the terpolymer is desirably in the range of between about 43° C. and 47° C., and preferably, the glass transition temperature is about 45° C. In preferred embodiments, the latex coating includes an alkylated melamine formaldehyde cross-linking agent. Of these, preferred is hexamethoxymethyl melamine. The cross-linking agent is generally used in an amount of about 5 percent to about 30 percent, based on the weight of the total solids, and most preferably, about 15 percent to about 25 percent, based on the weight of the total solids.

In general, the latex may be at least about 0.001 micron thick. Desirably, it is about 0.01 to about 0.5 micron thick and preferably it is about 0.01 to about 0.05 micron thick.

One or more layers of the optional latex coating may be applied sequentially to either one or both sides of the polyester film and the latex may include additional additives, as desired.

For example, an antistatic agent may be included to reduce static charge. One such agent is stearamidopropyl dimethyl-$\beta$-hydroxy ethylammonium nitrate. This agent may be used in the amount of about 2.75 to 3.25 parts by weight per one part by weight of terpolymer in the latex, and is more fully described in the U.S. Pat. No. 4,214,035 entitled "Antistatic Coated Polyester Film" incorporated herein by reference. Generally this optional latex coating is at least about 0.001 micron thick. Desirably it is about 0.001 to 0.5 micron thick and preferably 0.001 to about 0.05 micron thick.

The radiation curable silicone coating employed in the present invention is derived from an aqueous coating composition comprising a dispersion of colloidal silica in lower aliphatic alcohol-water solution of the partial condensate of a silanol of the formula $RSi(OH)_3$ in which R is selected from the group consisting of unsubstituted and inertly substituted alkyl radicals having one to three carbon atoms and unsubstituted and inertly substituted phenyl radicals, at least about 70 weight percent of said silanol being of the above formula wherein R is $-CH_3$, said coating composition containing about 10 to about 70 weight percent of said colloidal silica and about 30 to about 90 weight percent of said partial condensate, based on the total solids weight. "Inertly substituted" means having substituents which in no way have a detrimental effect on the functional aspects of the silicone coating as employed in the product and the process of the present invention. The silicone composition is azeotropically dried in toluene to take out any water or lower aliphatic alcohol formed in the condensation reaction and the toluene is then removed by distillation. The silicone composition is then blended with multifunctional acrylate monomers or oligomers with optional photoinitiators. If the composition is to be cured by an electron beam, no photoinitiator is required for catalysis. If ultraviolet radiation is to effect curing, then a photoinitiator is required. The composition may also include other optional additives such as flow agents, stabilizers, antioxidants, accelerators, dyes, inhibitors, activators, fillers, pigments, antistatic agents, flame-retardant agents, thickeners, thixotropic agents, surface-active agents, viscosity modifiers, extending oils, plasticizers, tackifiers and the like. A non-exhaustive list of multifunctional acrylates useful for the present invention includes, 1,3-butanediol diacrylate; diethylene glycol diacrylate; 1,6-hexanediol diacrylate; neopentyl glycol diacrylate; tetraethylene glycol diacrylate; triethylene glycol diacrylate; tetrahydrofurfural diacrylate; pentaerythritol tetra-acrylate; tripropylene glycol diacrylate; ethoxylated Bisphenol A diacrylate; trimethylol propane triacrylate; dipentaerythritol hydroxypenta-acrylate; as well as acrylated epoxies, urethanes and alkyds.

A non-exhaustive list of photoinitiators includes: $\alpha,\alpha$-diethoxyacetophenone, benzophenone, acetophenone, acenaphthenequinone, o-methoxy benzophenone, thioxanthen-9-one, xanthen-9-one, 7H-Benz(de)anthracen-7one, dibenzosuberone, 1-naphthaldehyde, 4,4'-bis (dimethylamino) benzophenone, fluorene-9-one, 1'-acetonaphthane anthraquinone, 1-indanone, 2-tertbutyl anthraquinone, valerophenone, hexanophenone, 3-phenylbutyrophenone, p-morpholinopropiophenone, 4-morpholino-benzophenone, p-diacetyl-benzene, 4-amino-benzophenone, 4'-methoxyacetophenone, benzaldehyde, $\alpha$-tetralone, 9-acetylphenanthrene, 2-acetylphenanthrone, 10-thioxanthenone, 3-acetylphenanthrene, 3-acetylindole, 1,3,5-triacetylbenzene and the like, including blends thereof.

Preferably the silicone ingredient comprises from 50 percent to 90 percent or more preferably 60 percent to 90 perent by weight of the final coating composition. Preferably the acrylate ingredient comprises 10 percent to 50 percent or more preferably 10 percent to 40 percent of the coating composition. The photoinitiator, when one is employed, comprises up to 10 percent of the composition.

In general, the silicone coating is at least about 1 micron thick. Desirably, it is about 1 to about 15 microns thick and is preferably about 2 to about 10 microns thick.

The Process

In the coating process of the present invention, the starting material flexible polyester film supports has been formed as described above and has been uniaxially stretched, preferably longitudinally.

In the preferred yet optional embodiment, the uniaxially drawn polyester film support may be corona treated prior to coating. That is, the film may be subjected to a corona discharge by a corona discharge apparatus prior to coating. The discharge treatment decreases the hydrophobic character of the polyester film surface. Although not essential, this step permits the water-based latex coating to more easily wet the surface and thus improve the adhesion of the coating to the surface.

Next, the above described latex coating is applied to the uniaxially drawn, flexible polyester film support. Application may be by any functional coating means and roller coating, especially reverse gravure, may advantageously be employed.

After coating and before stretching in a direction normal to the uniaxially drawn film, the film is dried by heating at a temperature in the range about 90° C. to 110° C. More preferably, the range is 95° C. to 105° C.

In a preferred embodiment, the thickness of the latex coating, after drying, on the polyester film is at least 0.003 dry pounds of coating per thousand square feet of biaxially drawn film. More preferably, the dry coating weight is in the range of between about 0.003 pounds to 0.007 pounds per thousand square feet of coated film. These thicknesses given in pounds per thousand square feet are approximate and to the extent that they result in different thicknesses over those described above in microns, the micron thicknesses above govern.

Next, the coated film is stretched in a direction which is normal to the direction of the original uniaxial stretching so as to produce a biaxially coated film. Degree of stretching in each direction is a matter of choice and is well within the purview of the artisan.

The silicone coating described above is next applied, using any functional technique, especially roller coating, e.g. direct gravure. It is subsequently radiation cured in air or preferably under a nitrogen blanket.

As shown in FIG. 1, a preferred embodiment of the present invention involves the application of a latex coating 5 onto polyester film support 3, and then the application of a silicone coating 7, with appropriate stretching and heating steps as outlined above, to result in a clear, flexible, coated, biaxially oriented polyester film 1.

Figure 2:
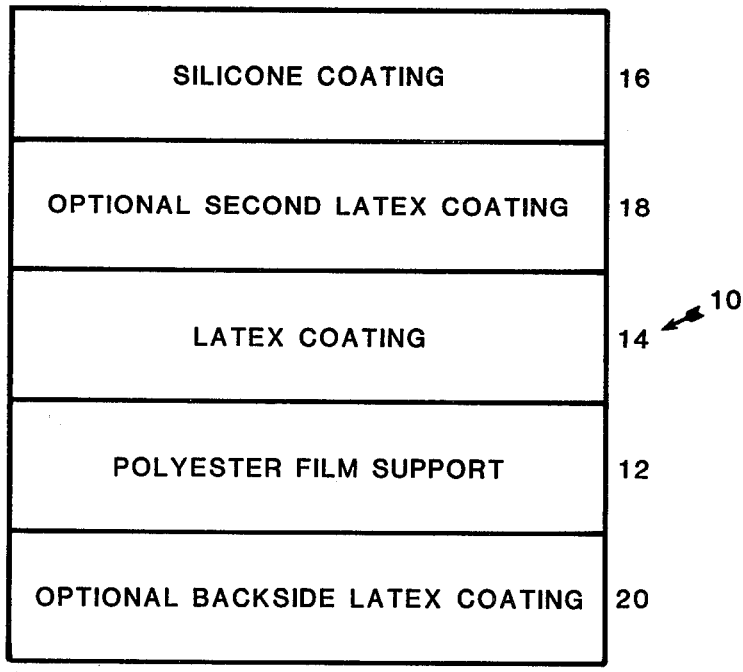
FIG. 2 illustrates a cut sectional view of an embodiment of the present invention film which includes some optional coating.

FIG. 2 illustrates a film 10 of the present invention having polyester film support 12, latex coating 14, and silicone coating 16, as well as optional second latex coating 18 between the latex coating 14 and the silicone coating 16. Additionally, an optional latex coating 20 on the opposite side of the film 10 is also shown. A latex coating such as 14 or an antistat coating could be applied as this optional coating 20. Variations of this illustrated coated film 10 without exceeding the scope of the present invention should now be apparent to the artisan.

Figure 3:
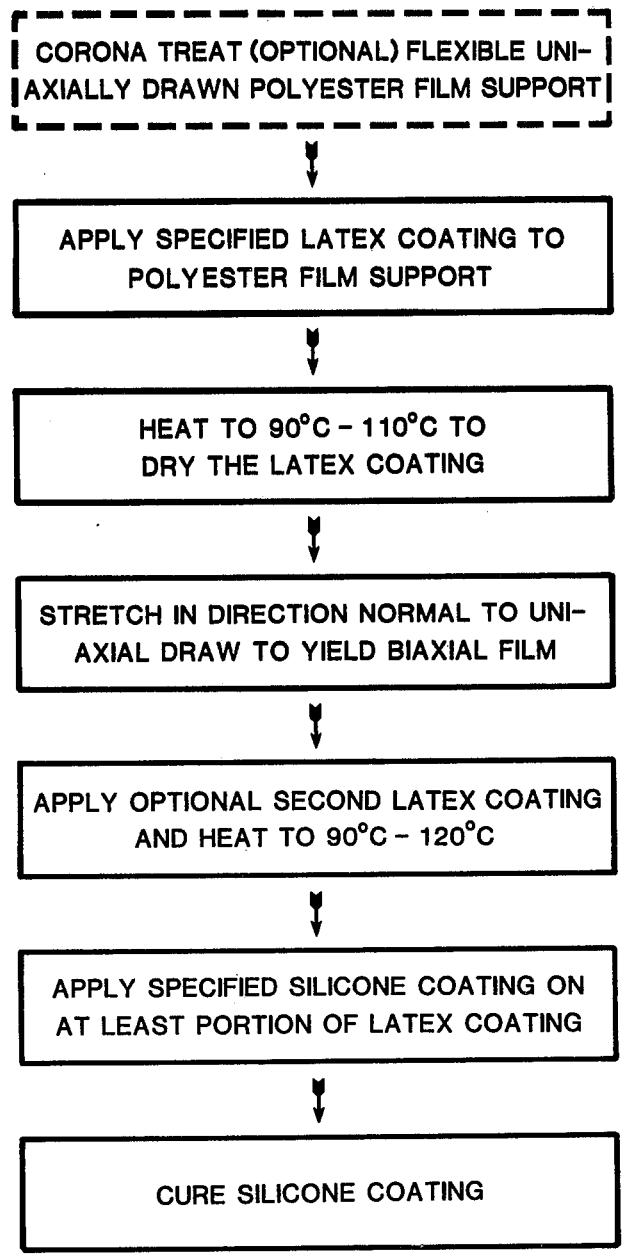
FIG. 3 illustrates a block flow diagram of the coating process of the present invention.

FIG. 3 illustrates a block diagram of the coating process of the present invention. First, an optional corona treatment may or may not be applied to the flexible, uniaxially drawn polyester film support. Next, the specified latex coating is applied to the film support and it is then heated to 90° to 110° C. to dry the latex coating.

The film is then stretched normally to the original draw to produce a biaxially oriented film. The optional primer coating may then be applied, if desired, and dried. Lastly, the silicone coating is applied, and then it is cured by ultraviolet or electron beam radiation in air or under a nitrogen blanket.

EXAMPLES

The following examples are given to illustrate the invention. Nothing contained in the examples should in any way be interpreted as limiting the scope and spirit of the invention illustrated by these examples.

EXAMPLE 1

Polyethylene terephthalate polymer is melted and extruded through a slit die onto a casting drum maintained at a temperature of about 20° C. The melt freezes to form a cast sheet. The cast sheet is longitudinally stretched at a draw ratio of approximately 3.6:1 while being maintained at a temperature of about 80° C.

The longitudinally drawn film is heated to a temperature of about 100° C. and is then stretched in the transverse direction at a draw ratio of 3.6:1 to produce a biaxially drawn film. The biaxially drawn film is heat set at a temperature of about 230° C. to yield an uncoated, clear, biaxially oriented polyester film.

EXAMPLE 2

Polyethylene terephthalate polymer is melted and extruded through a slit die onto a casting drum maintained at a temperature of about 20° C. The melt freezes to form a cast sheet. The cast sheet is longitudinally stretched at a draw ratio of approximately 3.6:1 while being maintained at a temperature of about 80° C.

The longitudinally drawn film is then corona treated by a corona discharge apparatus and thereinafter coated with a latex coating by reverse gravure coating.

A latex coating is coated onto the surface of the polyester film and includes 3.5 percent by weight, based on the total weight of the coating composition, of methyl methacrylate-ethyl acrylate-methacrylamide terpolymer. The ratio of the components of the terpolymer methyl methacrylate:ethyl acrylate:methacrylamide is about 69:26:5. The terpolymer is cross-linkable using a melamine-formaldehyde cross-linking agent, hexamethoxymethyl melamine, and is characterized by a glass transition temperature of 45° C. The weight ratio of terpolymer to cross-linker is about 80:20. The remaining constituent, water, comprises about 96.5 percent by weight of the latex coating.

The corona-treated, longitudinally drawn, coated film is dried at a temperature of about 100° C. Thereafter, the film is stretched in the transverse direction at a draw ratio of 3.6:1 to produce a biaxially drawn film. The biaxially drawn film is heat set at a temperature of 230° C. The thickness of the coating layer is about 0.02 micron. (This coating may be applied to one or both sides.)

EXAMPLE 3

A siloxane coating composition, formulated principally by combining a colloidal dispersion of submicron-sized silica, also known as silicon dioxide, with a siloxane resin such as an alkylalkoxysilane, namely methyl trimethoxysilane, is aged approximately four days to produce a partial condensate of methyltrihydroxysilane. The relative proportions of the main components are 35 percent silica and 65 percent siloxane. The partial condensate is mixed with trimethylolpropane trimethacrylate and an $\alpha,\alpha$-diethoxyacetophenone photoinitiator in a weight ratio of 70:25:5. The aforementioned composition is hereafter referred to as the silicone coating.

An 8.5×11 inch sheet of 7 mil (0.007 inch) film of Example 2 is coated with the silicone coating using a No. 3 wire-wound coating rod. The coating was UV cured in a PPG Radiation Polymer Curing Unit 1202An under nitrogen at 300 watts/inch (2 lamps) at 20 feet/minute belt speed.

The abrasion resistance of the coated film is evaluated by two different methods and found to be excellent. The test methods are: (1) Falling Sand Abrasion; and, (2) Taber Abrasion. Test results are shown in Tables I and II, respectively.

In the Falling Sand Abrasion Test, the silicone coated film is subjected to abrasion by 250 mls of falling sand. A Gardner Falling Sand Abrader is used to subject the film to the sand falling from a height of three feet through a 0.75 inch I.D. guide tube. The film specimen is placed at a 45° angle to and one inch from the lower end of the tube. The sand used is Ottawa silica sand No. 20–30. Before and after falling sand abrasion, optical haze of the film is measured using a Gardner hazemeter. Delta (Δ) haze, having units in percent, was calculated from the difference in percent haze before and after abrasion. Table I gives the percent haze and percent Δ haze values for silicone coated and control film subjected to falling sand abrasion. Each value is an average of five readings. The present invention coated sample of Example 3 exhibits considerably superior abrasion resistance over the control sample of Example 2, with a substantial improvement in percent Δ haze.

TABLE I

| | FALLING SAND ABRASION (% HAZE) | | |
|---|---|---|---|
| FILM | BEFORE | AFTER | Δ |
| Control Film of Example 2 (Non-Silicone Coated) | 2.22 | 65.10 | 62.88 |
| Silicone Coated Film of Example 3 (Present Invention) | 2.43 | 18.30 | 15.87 |

Taber Abrasion is performed on the films using the method ASTM D 1044-56 "Standard Method of Test for Resistance of Transparent Plastics to Surface Abrasion." The film is subjected to 500 cycles of Taber Abrasion using CS-10F rubber wheels loaded with 500 grams. As before, Gardner haze is measured before and after abrasion. The following Table II gives the haze values for Taber Abrasion for silicone coated and control film. Again the silicone coated film gives superior abrasion resistance. Each value is an average of five readings.

TABLE II

| | TABER ABRASION (% HAZE) 500 Cycles | | |
|---|---|---|---|
| FILM | BEFORE | AFTER | Δ |
| Control Film of Example 2 (Non-Silicone Coated) | 2.29 | 36.20 | 33.91 |
| Silicone Coated Film of Example 3 (Present Invention) | 2.36 | 4.84 | 2.48 |

In all cases, the silicone coated film of the present invention gave extremely high abrasion resistance as indicated by the low percent Δ haze values compared to the control film of Example 2.

EXAMPLE 4

An acrylic water-based emulsion is coated onto the film of Example 2 prior to coating with the silicone-based abrasion resistant coating given in Example 3. The acrylic emulsion is composed of a terpolymer of butylacrylate, methyl methacrylate and methacrylamide in the relative proportions of 69:26:5, respectively. The terpolymer is cross-linkable using a melamine-formaldehyde cross-linking agent, hexamethoxymethylmelamine, and is characterized by a glass transition temperature Tg of 38° C. The ratio of terpolymer to cross-linker is about 80:20. The remaining constituents, water and butyl cellosolve, comprise 96 percent by weight of the emulsion. The ratio of butyl cellosolve to water is 1:2. The solids are mixed together with the water and butyl cellosolve to produce a uniform mixture of the emulsion, which will hereafter be know as the primer.

An 8.5×11 inch sheet of 5 mil film of Example 2 is coated with the primer using a No. 3 wire-wound coating rod. The coated film is air dried in a hood at room temperature for thirty miniutes and oven dried in a forced air oven for thirty minutes at 120° C. After cooling, the primed film is coated with the silicone coating. The coated film is UV cured in a PPG Radiation Polymer Curing Unit under nitrogen at 200 watts/inch (2 lamps) at 80 feet/minutes belt speed.

The abrasion resistance of the primed and coated film is evaluated by Falling Sand Abrasion and Taber Abrasion according to the same procedures given in Example 3. The results were similar to those obtained in Example 3.

EXAMPLE 5

An 8½×11 inch sheet of 7 mil film from Example 1 is coated with the silicone coating of Example 3 using a No. 3 wire-wound rod. The coated film is UV cured as above.

The abrasion resistance of this sample is evaluated by the Falling Sand Abrasion and Taber Abrasion tests according to the procedures given in Example 3. Table III gives the percent haze and percent Δ haze for each abraded sample. Each value is an average of five readings.

TABLE III

| | FALLING SAND ABRASION (% HAZE) 250 mls sand | | |
|---|---|---|---|
| FILM | BEFORE | AFTER | Δ |
| Control Film of Example 1 (Non-Silicone Coated) | 1.89 | 55.84 | 53.95 |
| Silicone Coated Film of Example 5 (Present Invention) | 1.97 | 14.62 | 12.65 |
| | TABER ABRASION (% HAZE) 500 Cycles | | |
| FILM | BEFORE | AFTER | Δ |
| Control Film of Example 1 (Non-Silicone Coated) | 1.91 | 36.06 | 34.15 |
| Silicone Coated Film of Example 5 (Present Invention) | 1.87 | 5.77 | 3.90 |

All examples having silicone coating, i.e., Examples 3, 4 and 5 have better abrasion resistance than non-silicone coated film of Examples 1 and 2.

What is claimed is:

1. A clear, flexible, coated, biaxially oriented polyester film comprising:
   (a) a polyester film support;
   (b) a silicone coating composition on at least one side of said polyester film support said silicone coating comprising
      (i) a silica/silanol composition being derived from a composition comprising a dispersion of colloidal silica in a lower aliphatic alcohol-water solution of the partial condensate of a silanol of the formula $RSi(OH)_3$ in which R is selected from the group consisting of unsubstituted and inertly substituted alkyl radicals having one to three carbon atoms and unsubstituted and inertly substituted pheny radicals, at least about 70 weight percent of said silanol being of the above formula wherein R is $CH_3$, said silica/silanol composition containing about 10 to about 70 weight percent of said colloidal silica and about 30 to about 90 weight percent of said partial condensate, based on the total solids weight; and
      (ii) one or more multifunctional acrylate monomers and/or oligomers; and
      (iii) optionally one or more photoinitiators.

2. The film of claim 1 further comprising one or more layers of one or more cross-linkable acrylic compositions between said polyester film support and said silicone coating.

3. The film of claim 1 comprising said silicone coating composition on one side of said polyester film support and further comprising one or more layers of one or more cross-linkable acrylic compositions on the other side of said polyester film support.

4. The film of claim 3 further comprising one or more layers of one or more cross-linkable acrylic compositions between said polyester film support and said silicone coating.

5. The film of claim 2, 3 or 4 wherein said one or more cross-linkable acrylic compositions are selected from the group consisting of terpolymers of ethyl acrylate-methyl methacrylate-methacrylamide and butyl acrylate-methyl methacrylate-methacrylamide.

6. The film of claim 5 wherein said acrylic terpolymer is cross-linked with a partially or fully alkylated melamine formaldehyde.

7. The film of claim 6 wherein said alkylated melamine formaldehyde is hexamethoxymethyl melamine.

8. The film of claim 1, 2, 3 or 4 wherein said polyester film support contains at least a major amount of polyethylene terephthalate.

9. The film of claim 5 wherein said polyester film support contains at least a major amount of polyethylene terephthalate.

10. The film of claim 6 wherein said polyester film support contains at least a major amount of polyethylene terephthalate.

11. The film of claim 7 wherein said polyester film support contains at least a major amount of polyethylene terephthalate.

12. The film of claim 3 or 4 wherein the outmost layer of said acrylic composition, on the side of the support opposite to that containing the silicone coating, further comprises an anti-static composition.

13. The film of claim 12 wherein said anti-static composition comprises stearamidopropyl dimethyl-$\beta$-hydroxy ethylammonium nitrate.

14. A process for producing clear, flexible, coated, biaxially oriented polyester film comprising:
 (a) applying to a polyester film support a silicone coating composition on at least one side of said polyester film support said silicone coating comprising:
  (i) a silica/silanol composition being derived from a composition comprising a dispersion of colloidal silica in a lower aliphatic alcohol-water solution of the partial condensate of a silanol of the formula $RSi(OH)_3$ in which R is selected from the group consisting of unsubstituted and inertly substituted alkyl radicals having one to three carbon atoms and unsubstituted and inertly substituted phenyl radicals, at least about 70 weight percent of said silanol being of the above formula wherein R is $CH_3$, said silica/silanol composition containing about 10 to about 70 weight percent of said colloidal silica and about 30 to about 90 weight percent of said partial condensate, based on the total solids weight; and
  (ii) one or more multifunctional acrylate monomers and/or oligomers; and
  (iii) optionally one or more photoinitiators; and
 (b) Radiation curing said silicone coating composition.

15. The process of claim 14 comprising
 (a) corona treating a uniaxially drawn polyester film support; and
 (b) sequentially applying and drying one or more layers of one or more cross-linkable acrylic compositions to one or both sides of said film support and;
 (c) stretching said film support in a direction normal to the uniaxial draw; and
 (d) optionally sequentially applying and drying one or more layers of one or more cross-linkable acrylic compositions to one or both sides of said film support; and
 (e) applying said silicone coating composition to one or both sides of said coated polyester film support; and
 (f) radiation curing said silicone coating composition.

16. The process of claim 14 or 15 wherein said polyester film support comprises at least a major amount of polyethylene terephthalate.

17. The process of claim 16 wherein said acrylic composition is selected from the group consisting of ethyl acrylate-methyl methacrylate-methacrylamide and butyl acrylate-methyl methacrylate-methacrylamide terpolymers.

18. The process of claim 17 wherein said terpolymer is cross-linked with a partially or fully alkylated melamine formaldehyde.

19. The process of claim 18 wherein said alkylated melamine formaldehyde is hexamethoxymethyl melamine.

* * * * *